US010820344B2

(12) United States Patent
Jose et al.

(10) Patent No.: US 10,820,344 B2
(45) Date of Patent: Oct. 27, 2020

(54) PREAMBLE SIGNATURE SELECTION FOR CONTENTION BASED RANDOM ACCESS IN MOBILE COMMUNICATION (71) Applicant: T-Mobile USA, Inc., Bellevue, WA (US)

(72) Inventors: Fnu Abin Jose, Tempe, AZ (US); Ashwini Kumar, Chandler, AZ (US)

(73) Assignee: T-Mobile USA, Inc., Bellevue, WA (US)

(*) Notice: Subject to any disclaimer, the term of this patent is extended or adjusted under 35 U.S.C. 154(b) by 13 days.

(21) Appl. No.: 16/252,485

(22) Filed: Jan. 18, 2019

(65) Prior Publication Data
US 2020/0236707 A1 Jul. 23, 2020

(51) Int. Cl.
H04W 74/08 (2009.01)
H04W 76/18 (2018.01)
H04W 76/27 (2018.01)

(52) U.S. Cl.
CPC ........... *H04W 74/08* (2013.01); *H04W 76/18* (2018.02); *H04W 76/27* (2018.02)

(58) Field of Classification Search
CPC ..... H04W 74/08; H04W 76/18; H04W 76/27; H04W 74/0833; H04W 72/0413; H04W 74/004; H04W 48/18; H04W 8/12; H04W 48/16; H04W 60/06; H04W 24/10;
(Continued)

(56) References Cited

U.S. PATENT DOCUMENTS

2011/0274040 A1* 11/2011 Pani ................. H04W 4/70 370/328
2013/0114515 A1* 5/2013 Koo .................. H04J 11/0023 370/329
(Continued)

FOREIGN PATENT DOCUMENTS

WO 2018175442 9/2018

OTHER PUBLICATIONS

Birthday problem. Wikipedia, Sep. 2018 [online], [retrieved on Sep. 17, 2018]. Retrieved from the Internet <https://en.wikipedia.org/wiki/Birthday_problem>.
(Continued)

*Primary Examiner* — Gary Mui
*Assistant Examiner* — Michael K Phillips
(74) *Attorney, Agent, or Firm* — Han Santos, PLLC (57) ABSTRACT Techniques and examples pertaining to reducing preamble collision in contention-based random access (CBRA) from a user equipment (UE) to a base station of a mobile communication network are described. A method for selecting a preamble signature may involve identifying a quantity of preamble signatures reserved for CBRA in the mobile communication network. The method may also involve performing a modulo computation based on a unique identifier of the UE and the quantity of preamble signatures. The method may also involve designating one of the preamble signatures as a chosen preamble signature based on a result of the modulo computation. The method may further involve initiating a random access procedure using the chosen preamble signature to establish a communication link between the UE and the base station.

20 Claims, 6 Drawing Sheets (58) Field of Classification Search
CPC .. H04W 24/02; H04W 12/08; H04L 63/0892; H04L 63/101
See application file for complete search history.

(56) References Cited

U.S. PATENT DOCUMENTS

| | | | |
|---|---|---|---|
| 2013/0294310 A1* | 11/2013 | Yi | H04W 74/002 370/311 |
| 2015/0326995 A1* | 11/2015 | Li | H04W 74/08 370/329 |
| 2016/0100428 A1 | 4/2016 | Suzuki et al. | |
| 2016/0353440 A1* | 12/2016 | Lee | H04W 52/30 |
| 2017/0006639 A1* | 1/2017 | Shimizu | H04W 74/0833 |
| 2017/0019930 A1 | 1/2017 | Lee et al. | |
| 2018/0270868 A1* | 9/2018 | Ou | H04W 48/14 |
| 2018/0288810 A1* | 10/2018 | Ishii | H04W 74/0833 |
| 2019/0208436 A1* | 7/2019 | Zhou | H04L 1/0057 |
| 2019/0350000 A1* | 11/2019 | Zhang | H04W 72/0466 |
| 2020/0022188 A1* | 1/2020 | Lee | H04W 72/121 |
| 2020/0053772 A1* | 2/2020 | Pan | H04W 48/10 |
| 2020/0092846 A1* | 3/2020 | Deng | H04B 7/0695 |

OTHER PUBLICATIONS

Dahlman, Erik et al. 4G LTE/LTE-Advanced for Mobile Broadband. Academic Press, 2011, pp. 310-319 [online], [retrieved on Sep. 17, 2018]. Retrieved from the Internet <http://www.aldraji.com/download/4GLTEAMB.pdf>.

LTE Random Access Procedure. 2015 [online], [retrieved on Sep. 17, 2018]. Retrieved from the Internet <https://www.eventhelix.com/lte/random-access-procedure/lte-random-access-procedure.pdf>.

LTE; Evolved Universal Terrestrial Radio Access (E-UTRA); Medium Access Control (MAC) protocol specification. 3GPP TS 36.321 version 12.5.0 Release 12, Apr. 2015, [online], [retrieved on Sep. 17, 2018]. Retrieved from the Internet <https://www.etsi.org/deliver/etsi_ts/136300_136399/136321/12.05.00_60/ts_136321v120500p.pdf>, pp. 18-47.

Prach—Preamble Detection and Timing Advance Estimation for multi-UE in 3GPP LTE. MymoWireless.com [online], [retrieved on Sep. 17, 2018]. Retrieved from the Internet <https://www.mymowireless.com/wp-content/uploads/2017/02/White-Paper-PRACH-Preamble-Detection-and-Timing-Advance-Estimation-for- . . . pdf>.

Johnson, Chris. Long Term Evolution in Bullets, Chapter 24 Physical and MAC Layer Procedures, Section 24.1. Second Edition, Published 2012.

European Patent Application No. 20150066.7, Extended European Search Report dated May 15, 2020, 9 pages.

Intel Corporation: "Clarification on the carrier index for PDCCH order" 3GPP Draft; R2-1702996 ENB-IOT PDCCH Order, 3rd Generation Partnership Project (3GPP), Mobile Competence Centre, 650, Route Des Lucioles; F-06921 Sophia-Antipolis Cedex, France vol. RAN WG2, No. Spokane, Washington, USA; Apr. 3-7, 2017 Apr. 3, 2017 (Apr. 3, 2017), XP051244957, Retrieved from the Internet: URL:http://www.3gpp.org/ftp/Meeting 3GPP SYN/RAN2/Docs/ [retrieved on Apr. 3, 2017] paragraphs [Section 2], [Proposal1].

* cited by examiner

PREAMBLE SIGNATURE SELECTION FOR CONTENTION BASED RANDOM ACCESS IN MOBILE COMMUNICATION

BACKGROUND

In mobile or cellular communication, a user equipment (UE), such as a cellular phone, connects to a communication network by establishing a communication link with one of the base stations of the communication network over an air interface. An initial step of establishing such a communication link, or a "connection", from a UE to a base station may involve performing a "random access procedure". The random access procedure involves exchanging messages between the UE and the base station using a channel of the air interface called "random access channel", or RACH. Thus, the random access procedure is often referred to as a "RACH process". Often, when a UE needs to establish a connection to a base station, the UE would initiate or otherwise trigger a RACH process to attempt to access (i.e., connect to) the base station.

Specifically, RACH may include a sequence of time-frequency resources called "random access slots". Random access requests from the UE may be transmitted to the base station in random access slots. Depending on system configurations, a random access slot may be on the order of 1 millisecond in time. A RACH process starts by transmitting a message, called a "preamble", in a random access slot (RAS). The preamble is transmitted during a RAS using a complex sequence or pattern called a "preamble signature". There are multiple preamble signatures available to use for the RACH process, allowing multiple UEs to originate respective RACH processes at the same time (i.e., in the same RAS) over a shared RACH. As long as the multiple UEs use different preamble signatures for the RACH processes, the RACH processes would not interfere with each other, even if they are happening during a same period of time. However, if two UEs are using a same preamble signature to connect to a same base station, a so-called "preamble collision" happens. The two RACH processes using the same preamble signature at the same time would interfere with one another, and consequently at least one of the two RACH processes may lead to an unsuccessful establishment of a communication link with the base station. Given that the total number of preamble signatures available for RACH is fixed, and that according to existing technologies each of the UEs chooses a preamble signature randomly and independently, preamble collision is common when the number of UEs initiating RACH processes at the same time becomes significant as compared to the number of preamble signatures available. The problem is especially eminent when the number of UEs served by a base station increases. That is, the more UEs a base station serves, the more UEs may initiate RACH processes at the same time, and thus the higher the chance of preamble collision. A higher probability of preamble collision leads to a lower radio resource control (RRC) success ratio, a lower RACH success ratio, as well as a longer call setup time, both negatively impacting the quality of service (QoS) of mobile communication and quality of experience (QoE) of the users thereof.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

As mentioned above, there is a problem of preamble collision due to a possibly large number of user equipments (UEs) each randomly choosing one of a fixed number of preamble signatures for random access channel (RACH) process. Aspects of the present disclosure address this problem. Further details are described below.

RACH process is one of the most important steps in mobile communication protocols, including long term evolution (LTE) technology. It is the first message from a UE to a base station (hereinafter interchangeably referred to as "eNodeB", or "eNB") during a mobile-originating (MO) call initialization process. RACH in LTE is used to obtain uplink synchronization between UE and eNB, and also to obtain the resource for the following radio resource control (RRC) connection request.

In LTE, synchronization in downlink channels is obtained by special synchronization channels in downlink (i.e., communication link from eNB to UE). The special synchronization channels include primary synchronization signal (PSS) channels and secondary synchronization signal (SSS) channels. A downlink synchronization signal is broadcast to every UE constantly with a certain interval. In contrast, synchronization processes in uplink (i.e., communication link from UE to eNB) need to meet a different set of criteria: (1) The synchronization process should happen when there is immediate necessity; and (2) The synchronization should be dedicated to a specific UE. Such synchronization process in uplink is called "random access". There are two types of random access processes: contention-based random access (CBRA) and contention-free random access (CFRA). CBRA and CFRA differ in a way of using a preamble signature in the RACH process, as detailed below.

When a UE transmits a RACH preamble for either CBRA or CFRA, the preamble is transmitted with a specific pattern, and this specific pattern is called a "signature", or "preamble signature". A mobile communication network has a plurality of base stations each serving UEs within a respective area called a "cell". A total number of preamble signatures available for RACH processes within each cell is a fixed number, and the fixed number has a same value for each of the cells in the mobile communication network. For example, each LTE cell has a total of 64 preambles signatures available for the RACH process. Some of the 64 preambles signatures are reserved for use by CFRA, whereas the rest of the 64 preambles signatures are reserved for use by CBRA. The preamble signatures are mathematically mutually orthogonal to each other. The orthogonality of the preamble signatures ensures that two RACH processes happening at the same time within a cell would not interfere with one another as long as the two RACH processes use different preamble signatures.

Each CFRA is initiated by the network and uses a dedicated random preamble signature allocated to a specific UE. CFRA can be used as part of a handover process to gain time synchronization with a new cell. CFRA can also be used prior to downlink data transfer in RRC-connected state when the UE is not time synchronized with the network. Since CFRA is initiated by the network, the network can decide and assign which preamble signature is to be used by an eNB for a specific UE, and thus there is no risk of preamble collision.

In contrast, CBRA implies an inherent risk of preamble collision. CBRA is initiated by a Medium Access Control (MAC) layer of a UE to gain access to network (i.e., to eNB). CBRA involves the UE selecting a random-access preamble signature from a list of contention-based preamble signatures available for selection by all UEs in the cell. The list of contention-based preamble signatures is broadcast to every UE constantly with a certain interval. According to existing LTE mobile communication protocols, each UE selects a random one of the preamble signatures in the list for the RACH process. Namely, each UE may pick any of the signatures in the list with equal probability. Thus, there is a chance of two or more UEs within the cell trying to access the eNB using a same preamble signature and in a same RAS, resulting in a preamble collision. Therefore, CBRA requires additional signaling steps to resolve contention when multiple UEs attempt to access the cell using the same preamble signature at the same time.

Figure 1A:
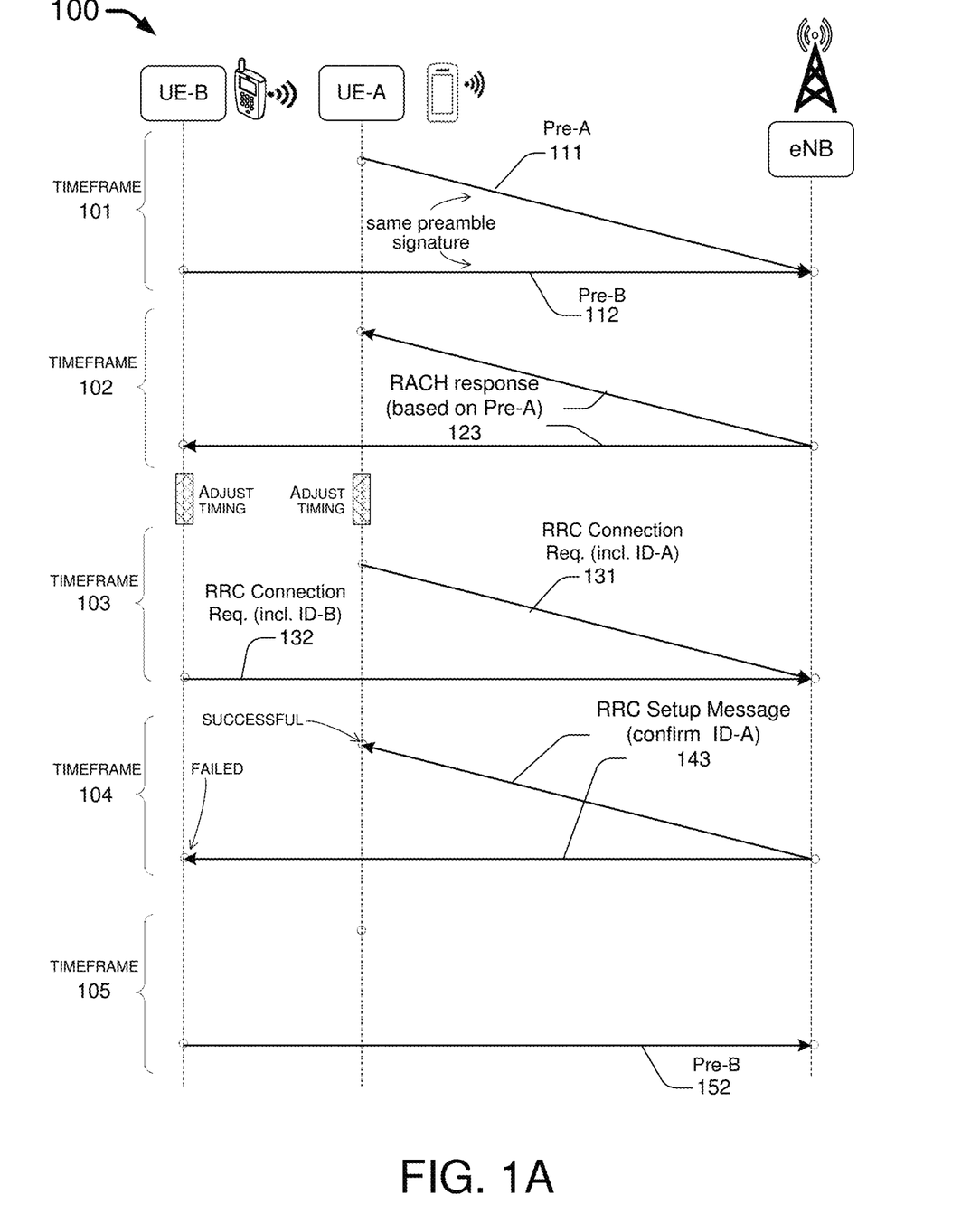
FIG. 1A is a data flow chart illustrating a preamble collision between two UEs.

Obviously, the additional signaling steps required for contention resolution will add to call setup time and network access time. This can be explained by an example preamble collision as described in data flow chart 100 of FIG. 1A. As shown in FIG. 1A, two UEs in a cell, UE-A and UE-B, may attempt to access a base station, eNB, using a same random access slot (RAS) during timeframe 101. Moreover, UE-A and UE-B may happen to select a same preamble signature, such that each of UE-A and UE-B initiates a RACH process by sending a respective preamble using the same preamble signature. The eNB would receive both the preamble 111 sent from UE-A and the preamble 112 sent from UE-B, but only respond in a subsequent timeframe 102 with a RACH response 123 based on one of the two preambles, say, preamble 111 sent from UE-A. Therefore, RACH response 123 would include information intended for UE-A but not for UE-B. For example, RACH response 123 may include an uplink timing adjustment information intended only for UE-A. That is, the uplink timing adjustment information would work for UE-A but not for UE-B. Since UE-A and UE-B use the same preamble signature, RACH response 123 would be detected by both UE-A and UE-B. Each of UE-A and UE-B would subsequently adjust its transmission timing according to the uplink timing adjustment information included in RACH response 123 and send out a respective RRC connection request to eNB using the adjusted timing in a subsequent timeframe 103. The RRC connection request includes a terminal identity, i.e., an identifier that uniquely identifies the UE that transmits the RRC connection. That is, the RRC connection request 131 sent out by UE-A includes an identity of UE-A (i.e., ID-A), whereas the RRC connection request 132 sent out by UE-B includes an identity of UE-B (i.e., ID-B). Since the uplink timing adjustment information is intended for UE-A but not for UE-B, the RRC connection request 131 sent by UE-A would be successfully detected by eNB, whereas the RRC connection request 132 sent by UE-B would not. In a subsequent timeframe 104, the eNB would then respond by confirming the identity of UE-A in an RRC setup message 143 sent in the downlink, which would be received by both UE-A and UE-B. RRC setup message 143 represents a contention resolution between UE-A and UE-B. Since the RRC setup message 143 contains the identity of UE-A (i.e., ID-A), UE-A would know the RACH process it initiated is successful upon receiving RRC setup message 143. On the other hand, upon receiving RRC setup message 143, UE-B would know the RACH process it initiated has failed, as the identity included in RRC setup message 143 is the identity of UE-A, not the identity of UE-B. In order to gain access to eNB, UE-B would need to initiate another RACH process in a later timeframe 105 by transmitting the preamble 152 in another RAS, which may or may not use the same preamble signature. Namely, the UE-B has initiated a RACH process that has failed due to a preamble collision, and thus has to start another RACH process to gain access to the eNB. As explained above, preamble collision does add to call setup time and network access time for UE-B, and negatively impacts the quality of service (QoS) and quality of experience (QoE) for UE-B. Clearly, the higher the probability of preamble collision within a cell, the longer the call setup time and network access time for the UEs within the cell will be, and consequently the worse the QoS and QoE of the mobile communication.

For conventional implementations of CBRA, the probability of preamble collision within a cell increases as the load of the cell becomes heavier. That is, the greater number of UEs that are served by an eNB, the more debilitating the QoS and QoE would become. Specifically, the probability of two RACH processes having a preamble collision can be expressed as $$P(C, n) = 1 - \frac{C!}{C^n \cdot (C-n)!} \qquad \text{(Eq. 1)}$$

whereas C is the total number of preamble signatures available for CBRA in a cell, n is the number of UEs in the cell initiating RACH processes in a same RAS, and ! is the factorial operator.

Take LTE as an example. Each LTE cell has a total of 64 preambles signatures available for RACH process. Out of the 64 preamble signatures, 24 preamble signatures are reserved for CFRA processes, whereas the rest of 40 preamble signatures are available for CBRA processes. When there are five UEs in a cell initiating CBRA processes in a same RAS, the probability of two of the five UEs having preamble collision can be calculated using Eq. 1 as:

$$P(40, 5) = 1 - \frac{40!}{40^5 \cdot (40-5)!} = 22.9\% \qquad \text{(Eq. 2)}$$

Similarly, when there are twelve UEs in a cell initiating CBRA processes in a same RAS, the probability of two of the twelve UEs having preamble collision is:

$$P(40, 12) = 1 - \frac{40!}{40^{12} \cdot (40-12)!} = 84.0\% \qquad \text{(Eq. 3)}$$

The increased probability (i.e., from 22.9% to 84.0%) illustrates that when the traffic becomes heavier in the cell, the probability of preamble collision increases rapidly. Moreover, when there are 23 UEs in the cell attempting to access eNB via CBRA processes in a same RAS, preamble collision is almost guaranteed to happen, as the probability of two of the 21 UEs having preamble collision increases to:

$$P(40, 21) = 1 - \frac{40!}{40^{21} \cdot (40-21)!} = 99.9\% \quad \text{(Eq. 4)}$$

Figure 1B:
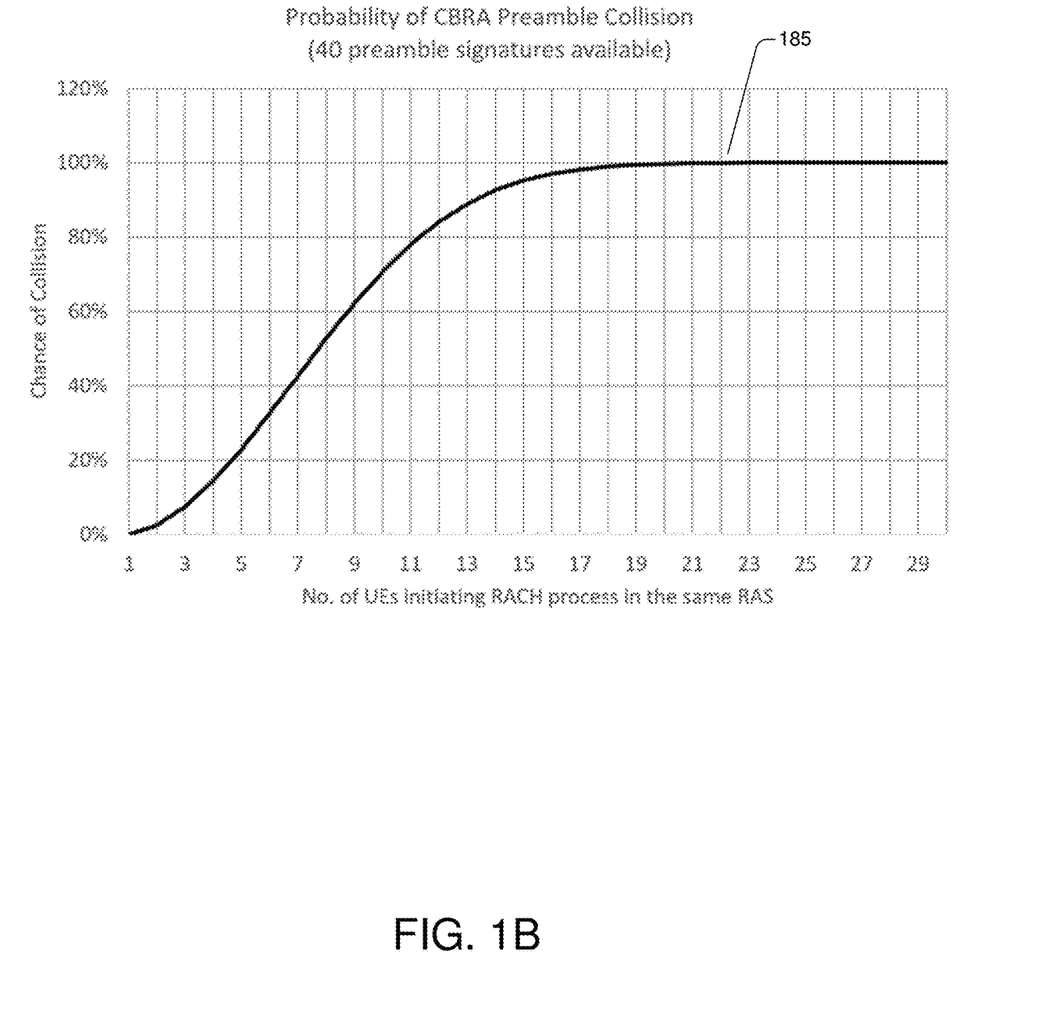
FIG. 1B illustrates a probability curve of a UE having a preamble collision with one or more other UEs in a cell.

For further illustrating the LTE example whereas 40 preambles are available for CBRA processes, FIG. 1B shows a probability curve 185 of a UE having a preamble collision with one or more other UEs in a cell. That is, curve 185 of FIG. 1B represents a chance of multiple UEs in the cell initiating CBRA processes during a same RAS using a same preamble signature. As shown in FIG. 1B, the probability of preamble collision increases rapidly as the number of the UEs increases.

Accordingly, aspects of the present disclosure are directed to techniques for a UE to choose a preamble signature for CBRA process in a way that the chance of preamble collision is reduced. Rather than randomly choosing one preamble signature from the list of the preamble signatures reserved for CBRA, a UE using techniques in the present disclosure would pick a preamble signature according to a result of a modulo computation that involves a unique identifier of the UE and a size of the list (i.e., a quantity of the preamble signatures reserved for CBRA). This may result in a more uniform usage of the preamble signatures when multiple UEs attempt to access eNB at the same time, thereby reducing the chance of preamble collision.

As explained above, the ability for a UE to establish a successful communication link to a base station without having a preamble collision is crucial to the QoS and QoE of mobile communication. The techniques described in the present disclosure enable a UE to choose a preamble signature for RACH process based on a unique identifier of the UE, instead of randomly picking one preamble. When some, most, or all of the UEs served by a sector of the base station choose a preamble using the techniques described herein, the usage of the preamble signatures becomes more evenly distributed, and the chance of preamble collision is reduced. As a consequence, overall RRC success ratio for the UEs is enhanced, and the average setup time for placing a call is improved. The higher RRC success ratio and the shortened call setup time directly lead to an improved QoS and QoE of mobile communication service provided by the base station to the UEs.

The techniques described herein may be implemented in a number of ways. Example implementations are provided below with reference to the following figures.

Example User Equipment Components

Figure 2:
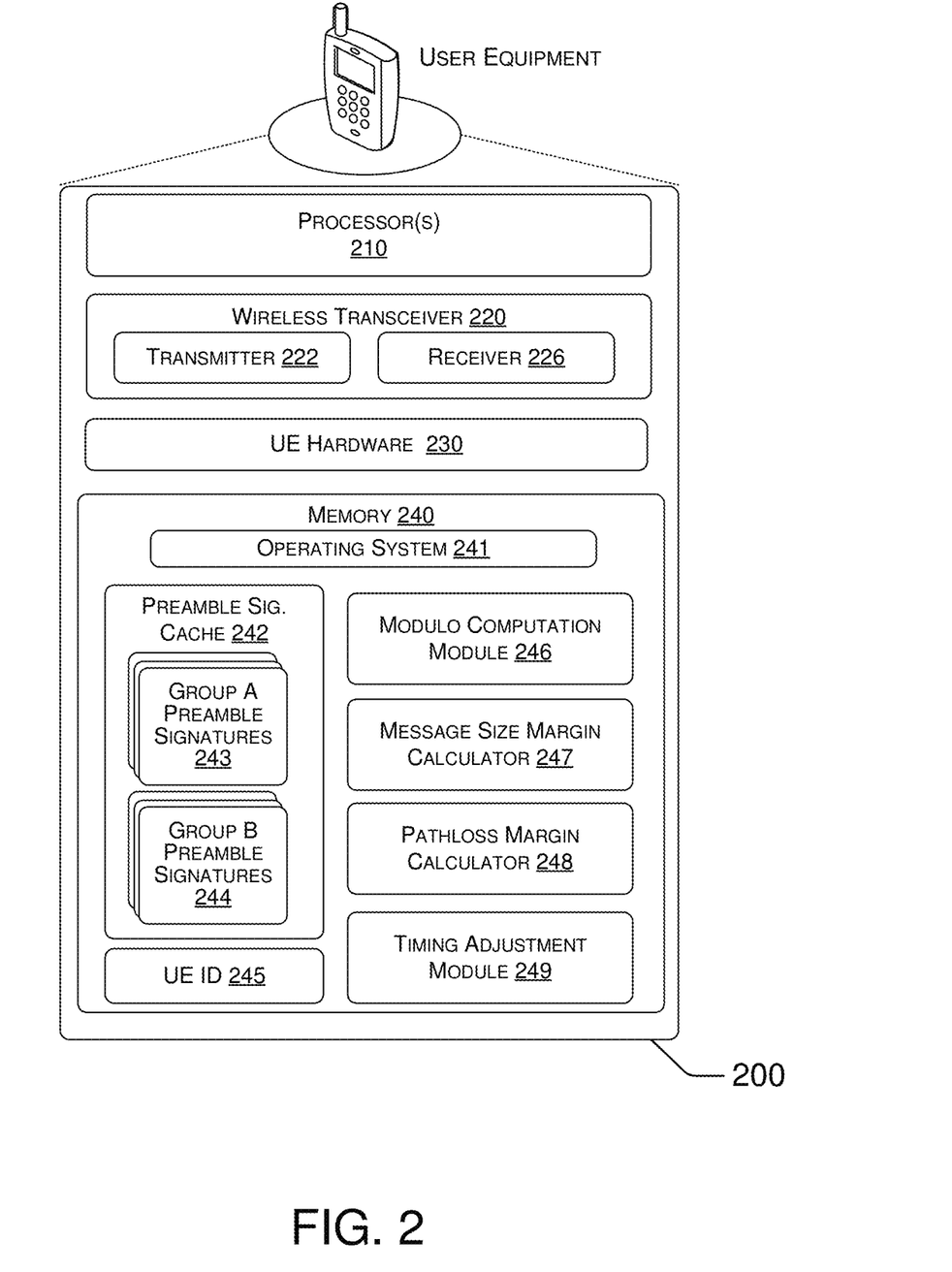
FIG. 2 is a block diagram showing various components of a UE that is configured to select a preamble signature and initiate a RACH process according to the present disclosure.

FIG. 2 illustrates a block diagram showing various components of UE 200, which may be UE-A or UE-B of FIG. 1A. As shown in FIG. 2, UE 200 may include one or more processors 210, wireless transceiver 220, UE hardware 230, and memory 240.

Wireless transceiver 220 may include a transmitter 222 and a receiver 226 that enable UE 200 to perform wireless communication with a base station of a mobile communications network, such as eNB of FIG. 1A. On the transmitting end, transmitter 222 may enable UE 200 to transmit a preamble (e.g., preamble 111 or 112 of FIG. 1A) and a RRC connection request (e.g., RRC connection request 131 or 132 of FIG. 1A) as part of RACH process. On the receiving end, receiver 226 may enable UE 200 to receive a RACH response (e.g., RACH response 123 of FIG. 1A) or a RRC setup message (e.g., RRC setup message 143 of FIG. 1A) from the base station. Receiver 226 may also enable UE 200 to receive the list of preamble signatures broadcast by the base station that are reserved for CBRA. Transmitter 222 may include a power amplifier (PA) whereas receiver 226 may include a low-noise amplifier (LNA).

UE hardware 230 may include other hardware that is typically located in a mobile communication terminal. For example, UE hardware 230 may include signal converters, transceivers, antennas, hardware decoders and encoders, graphic processors, a subscriber identification module (SIM) card slot, and/or the like that enable UE 200 to execute applications and collaborate with wireless transceiver 220 to provide wireless communication capabilities.

Memory 240 may be implemented using non-transitory computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

Memory 240 may include programs or software procedures that, when executed by processor(s) 210, enable UE 200 to perform various functions as described herein. As shown in FIG. 2, memory 240 may include an operating system 241, a preamble signature cache 242, UE identifier 245, modulo computation module 246, message size margin calculator 247, pathloss margin calculator 248, as well as timing adjustment module 249. Operating system 241 may include components that manage or otherwise coordinate processor(s) 210 and UE hardware 230 with software resources to perform various functions generally associated with a terminal device of a mobile communication network.

Preamble signature cache 242 is configured to store the list of preamble signatures reserved for CBRA that is broadcast by the base station (e.g., the eNB of FIG. 1A). The list of preamble signatures may be stored in a certain order or sequence that is maintained in preamble signature cache 242. In some embodiments, the list of preamble signatures may include group A preamble signatures 243 and group B preamble signatures 244. The preamble signatures in group A preamble signatures 243 maintain a certain order or sequence that is unchanged, whereas the preamble signatures in group B preamble signatures 244 also maintain a certain order or sequence that is unchanged. Based on a message size margin calculated by message size margin calculator 247 and a pathloss margin calculated by pathloss margin calculator 248, processor(s) 210 may select either one of group A preamble signatures 243 or one of group B preamble signatures 244 as a chosen preamble signature.

Processor(s) 210 may subsequently direct transmitter 222 to transmit a preamble using the chose preamble signature in a RAS for initiating a RACH process.

UE identifier 245 is an identifier that uniquely identifies UE 200 to other parties (e.g., base stations, core network, other networks, as well as other terminal devices or UEs) of the mobile communication network. In some embodiments, UE identifier 245 may be a Mobile Station International Subscriber Directory Number (MSISDN) defined by E.164 numbering plan. In some embodiments, UE identifier 245 may be an Integrated Circuit Card Identifier (ICCID), namely, a SIM number. MSISDNs and SIM numbers are positive integers. Typically, mobile communication operators that provides mobile communication services to users of UEs assign MSISDNs and ICCIDs in sequential orders.

Modulo computation module 246 is capable of executing a modulo computation between two positive integers, a dividend and a divisor, and report a remainder of the modulo computation. That is, modulo computation module 246 operates a division operation by dividing the dividend by the divisor, and then finds the remainder of the division operation. With the dividend represented by a and the divisor by n, expression "a modulo n" (abbreviated as "a mod n") gives the remainder of the Euclidean division of a by n. For example, 10 mod 3 would evaluate to 1. Modulo computation module 246 may operate a modulo computation that involves a MSISDN or a ICCID.

Message size margin calculator 247 is capable of calculating a message size margin related to data to be transmitted in an uplink from UE to eNB after a communication link between UE and eNB is established as a result of a CBRA process. Specifically, the message size margin is defined by how much less a sum of the size of the data to be transmitted, a size of a MAC header, and a size of MAC control elements is as compared to a message size threshold. The message size threshold is a cell parameter and is applicable to all CBRA attempts initiated within the cell. If the sum is less than the message size threshold, the message size margin is determined as positive. Namely, message size margin is positive if
size of {data+MAC header+MAC control elements}<message size threshold Pathloss margin calculator 248 is capable of calculating a pathloss margin related to a pathloss of the uplink from UE to eNB. The pathloss margin is related to the following parameters: (1) UplinkPathLoss, which represents reduction in power density from UE to eNB caused by propagation loss; (2) preambleInitialReceivedTargetPower, which represents an initial transmit power of the preamble; (3) deltaPreambleMsg3, which represents a nominal power used for uplink transmission; (4) messagePowerOffsetGroupB, which represents a pathloss threshold offset; and (5) PCMAX, which is a preamble power threshold that represents a maximum output power by each antenna of the cell, referenced at an antenna connector thereof. Specifically, the pathloss margin is defined by how much less a sum of UplinkPathLoss, preambleInitialReceivedTargetPower, deltaPreambleMsg3, and messagePowerOffsetGroupB is as compared to PCMAX. The preamble power threshold, PCMAX, is a cell parameter and is applicable to all CBRA attempts initiated within the cell. If the sum is less than the preamble power threshold, the pathloss margin is determined as positive. Namely, pathloss margin is positive if
{UplinkPathLoss+preambleInitialReceivedTargetPower+ deltaPreambleMsg3+ messagePowerOffsetGroupB}<PCMAX Timing adjustment module 249 is configured to adjust a timing of messages transmitted by transmitter 222 from UE to eNB. For example, timing adjustment module 249 may adjust the timing of transmitting the signal according to the uplink timing adjustment information included in RACH response 123 of FIG. 1A. A main purpose of the timing adjustment is to compensate for propagation delay in the uplink so that the timing of the transmitted signal as received at eNB will better align with the timing of the mobile communication system.

Example Processes

Figure 3A:
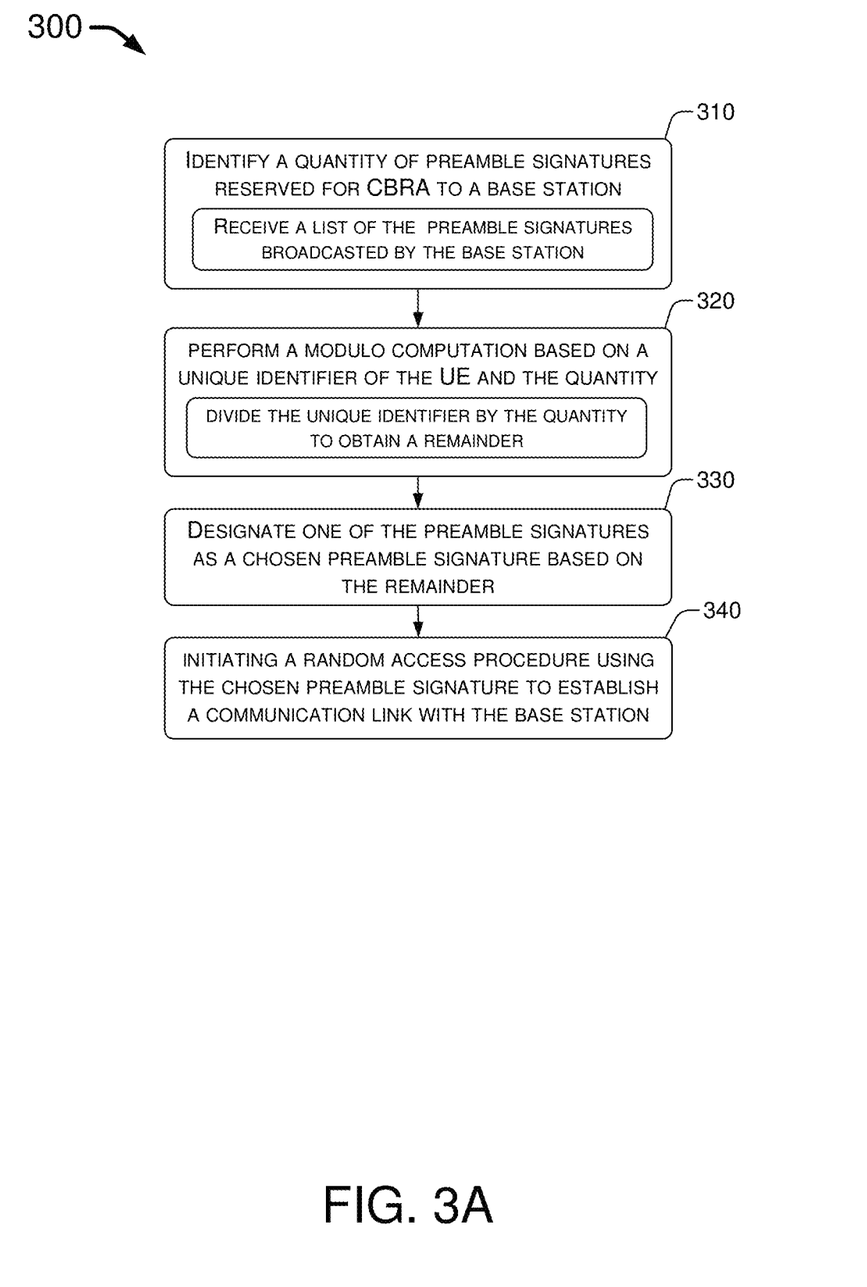
FIG. 3A is a flow diagram of an example process for a UE to initiate a contention-based random access (CBRA) process.
Figure 3B:
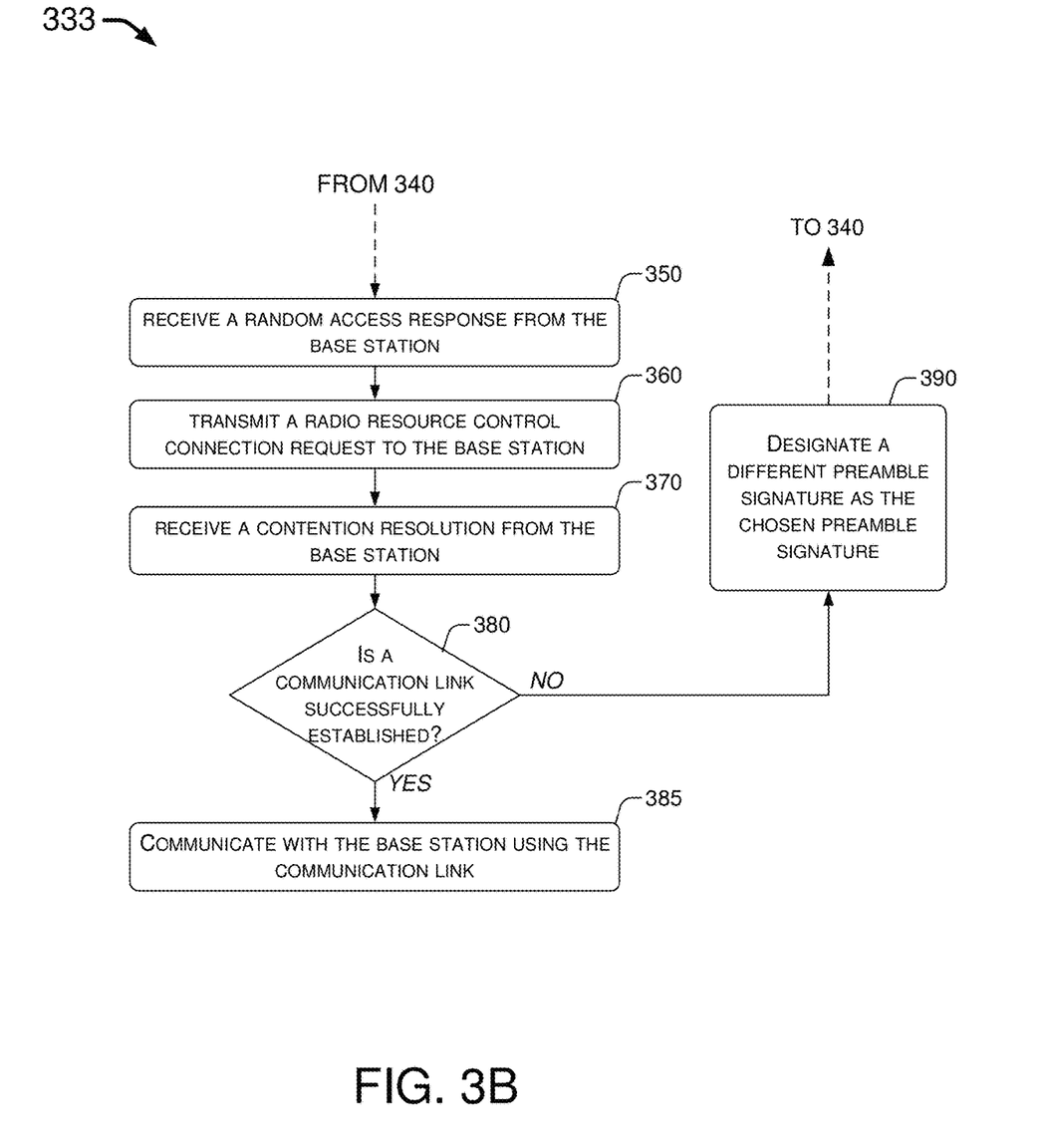
FIG. 3B is a flow diagram of an example process for a UE to establish a communication link with an eNB through the CBRA process of FIG. 3A.
Figure 4:
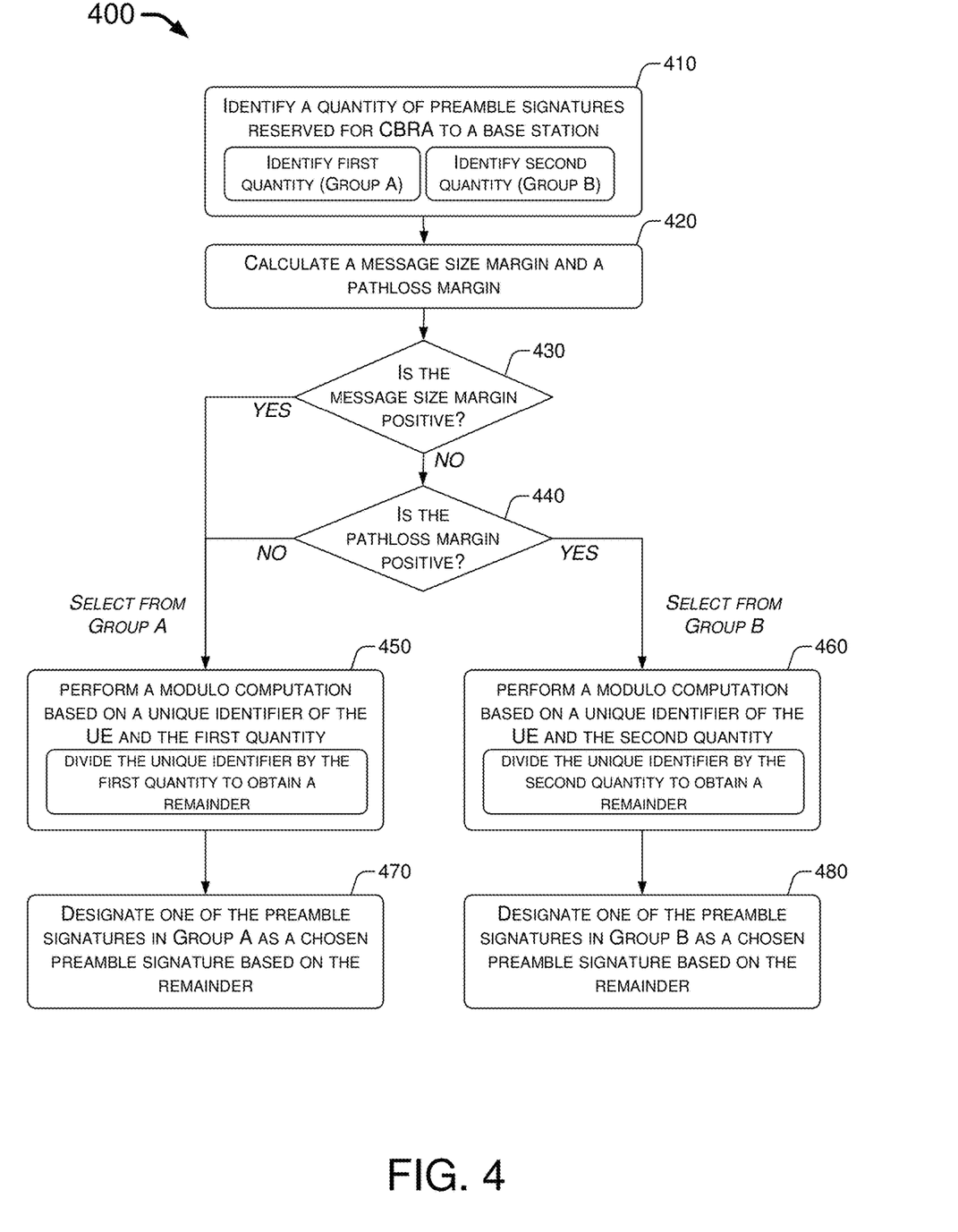
FIG. 4 is a flow diagram of an example process for a UE to designate a preamble signature for the CBRA process of FIG. 3A.

FIG. 3A presents an illustrative process 300 for a UE to select a preamble signature and initiate a random access procedure in an attempt to establish a communication link with an eNB. FIG. 3B presents an illustrative process 333 for a UE to actually establish the communication link with the eNB through CBRA. Specifically, process 333 may be utilized in conjunction with process 300, where process 300 includes selecting a preamble signature and initiating a random access procedure, whereas process 333 includes establishing the communication link utilizing the selected preamble signature. FIG. 4 presents an example process 400 for a UE to select or otherwise designate a preamble signature for CBRA process 300. Each of processes 300, 333, and 400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 300, 333 and 400 are described with reference to data flow chart 100 of FIG. 1A and UE 200 of FIG. 2.

FIG. 3A is a flow diagram of an example process 300 for a UE to initiate a random access procedure in an attempt to establish a communication link with a base station through CBRA. Process 300 may begin at block 310.

At block 310, UE 200 may identify a quantity of a plurality of preamble signatures reserved for CBRA to the base station. Specifically, the base station may broadcast a list of the preamble signatures to all UEs within the cell, including UE 200. UE 200 may receive the list via receiver 226 of wireless transceiver 220. UE 200 may subsequently store the list of the preamble signatures in preamble signature cache 242. The size of the list indicates the quantity of the preamble signatures. UE 200 may identify the quantity of the preamble signatures reserved for CBRA from the size of list received by receiver 226 and subsequently stored in preamble signature cache 242. As described above, for a LTE network, there may be sixty-four (64) preamble signatures, forty (40) of which may be reserved for CBRA. A list of those 40 preamble signatures would be broadcast by eNB, and UE 200 would receive the list and save it in preamble signature cache 242. UE 200 would then identify that 40 is the quantity of the preamble signatures reserved for CBRA by examining preamble signature cache 242 that saves the list of the 40 preamble signatures. Process 300 may proceed from block 310 to block 320.

At block 320, modulo computation module 246 of UE 200 may perform a modulo computation based on a unique identifier of UE 200 (i.e., UE identifier 245). Specifically, modulo computation module 246 may perform a modulo computation of "(UE identifier 245) mod (quantity of preamble signatures stored in preamble signature cache 242)" to find a remainder thereof. For example, if UE identifier 245 of UE 200 is a MSISDN, "5022409139", and the quantity of the preamble signatures identified in block 310 is forty (40), then UE 200 may perform the modulo computation "5022409139 mod 40", which results in a remainder of nineteen (19). Process 300 may proceed from block 320 to block 330.

At block 330, UE 200 may designate one of the preamble signatures stored in preamble signature cache 242 as a chosen preamble signature based on the remainder obtained by modulo computation module 246 in block 320. As described above, the preamble signatures are stored in preamble signature cache 242 and maintain a certain order or sequence. Therefore, UE 200 may pick a preamble signature in the sequence based on the remainder. For example, if 40 preamble signatures are stored in preamble signature cache 242 and maintained in a sequence, given that the remainder is 19, UE 200 will designate the $19^{th}$ preamble signature in the sequence as the chosen signature. Process 300 may proceed from block 330 to block 340.

At block 340, UE 200 may initiate a CBRA process using the chosen preamble designated in block 330 to establish a communication link with the base station. For example, UE 200, as either UE-A or UE-B of FIG. 1A, may initiate a CBRA process to transmit preamble 111 or 112 to eNB in a RAS during timeframe 101 via transmitter 222. Process 300 may proceed from block 340 to block 350.

FIG. 3B is a flow diagram of an example process 333 for a UE to establish a communication link with an eNB through CBRA. Process 333 may begin at block 350 in response to the initiating process block 340 of FIG. 3A.

At block 350, UE 200 may receive a random access response from the base station via receiver 226. For example, UE 200, as UE-A or UE-B of FIG. 1A, may receive RACH response 123 from eNB. Process 333 may proceed from block 350 to block 360.

At block 360, UE 200 may transmit a RRC connection request to the base station via transmitter 222. For example, UE 200, as UE-A or UE-B of FIG. 1A, may transmit RRC connection request 131 or 132 to eNB. Process 333 may proceed from block 360 to block 370.

At block 370, UE 200 may receive a contention resolution from the base station indicating whether the communication link is successfully established. For example, UE 200, as UE-A or UE-B of FIG. 1A, may receive RRC setup message 143 as a contention resolution. Process 333 may proceed from block 370 to block 380.

At block 380, UE 200 may determine whether the communication link is successfully established based on the contention resolution received in block 370. As described above, since RRC setup message 143 confirms the identifier of UE-A rather than the identifier of EU-B, the contention resolution indicates that the CBRA process initiated by UE-A during timeframe 101 is successful, whereas the CBRA process initiated by UE-B during timeframe 101 has failed. That is, UE 200, as UE-A of FIG. 1A, may determine that a communication link between UE-A and eNB is successfully established based on RRC setup message 143. However, UE 200, as UE-B of FIG. 1A, may determine that a communication link between UE-B and eNB has failed to establish, based on the same RRC setup message 143. As described above, UE-B may initiate another RACH process in a following RAS, sending preamble 152 in a RAS during timeframe 105 of FIG. 1A. In some embodiments, UE 200 may transmit preamble 152 using the same chosen preamble signature designated in block 330 of FIG. 3A. In some embodiments, UE 200 may transmit preamble 152 using a different preamble signature in preamble signature cache 242 as the chosen signature. In summary, process 333 may proceed from block 380 to block 385 in an event that UE 200 determines that a communication link to the base station is successfully established. Process 333 may proceed from block 380 to either block 390 (i.e., as shown in FIG. 3B) or block 340 (i.e., an alternative embodiment not shown in FIG. 3B) in an event that UE 200 determines that a communication link to the base station has failed to establish.

At block 385, UE 200 may communicate with the base station using the communication link established via wireless transceiver 220.

At block 390, UE 200 may designate a preamble signature in preamble signature cache 242 that is different from the previous chosen preamble signature designated in block 330 and used in block 340. Process 333 may proceed from block 390 to block 340 of FIG. 3A.

FIG. 4 is a flow diagram of an example process 400 for performing blocks 310, 320 and 330 of process 300 and process 333 under a scenario where there are two mutually exclusive groups of preamble signatures reserved for CBRA, such as group A preamble signatures 243 and group B preamble signatures 244 stored in preamble signature cache 242 of FIG. 2. Process 400 illustrates how UE 200 may identify the quantity of the preamble signatures (i.e., block 310), perform the modulo computation (i.e., block 320), and select the chosen preamble signature (i.e., block 330) under the scenario of two mutually exclusive groups of preamble signatures. UE 200 may select the chosen preamble from one of the two groups depending on a size of data to be transmitted in the uplink (e.g., the data transmitted in process block 385), a pathloss of the uplink, or both. This involves message size margin calculator 247 to calculate a message size margin and pathloss margin calculator 248 to calculate a pathloss margin. Process 400 may begin at block 410.

At block 410, UE 200 may identify a quantity of the preamble signatures in each of the two groups. UE 200 may identify a first quantity which is the total number of preamble signatures in group A preamble signatures 243, as well as a second quantity which is the total number of preamble signatures in group B preamble signatures 244. As mentioned above, each LTE cell may have 40 preamble signatures reserved for CBRA. For example, if the 40 preamble signatures include 30 preamble signatures in Group A and 10 preamble signatures in Group B, then UE 200 will identify the first quantity as 30 and the second quantity as 10. Process 400 may proceed from block 410 to block 420.

At block 420, message size margin calculator 247 of UE 200 may calculate a message size margin, whereas pathloss margin calculator 248 may calculate a pathloss margin. As described above, the message size margin is defined by a difference between a message size threshold and a first sum that comprise the size of data to be transmitted, a size of a MAC header, and a size of MAC control elements. The message size threshold is a cell parameter and is applicable to all CBRA attempts initiated within the cell. The pathloss margin is defined by a difference between a preamble power threshold (i.e., PCMAX,c of the Serving Cell performing the Random Access) and a second sum that comprises the pathloss of the uplink, a preambleInitialReceivedTargetPower, a deltaPreambleMsg3, and a messagePowerOffset- GroupB. The preamble power threshold is also a cell parameter and is applicable to all CBRA attempts initiated within the cell. Process 400 may proceed from block 420 to block 430.

At block 430, UE 200 may determine whether the message size margin is positive or not. As described above, message size margin is determined to be positive if the first sum is less than the message size threshold. In an event that the message size margin is positive, process 400 may proceed from 430 to 450. In an event that the message size margin is not positive, process 400 may proceed from block 430 to block 440.

At block 440, UE 200 may determine whether the pathloss margin is positive or not. As described above, pathloss margin is determined to be positive if the second sum is less than the preamble power threshold. In an event that the pathloss margin is positive, process 400 may proceed from 440 to 460. In an event that the pathloss margin is not positive, process 400 may proceed from block 440 to block 450.

At block 450, modulo computation module 246 of UE 200 may perform a modulo computation based on a unique identifier of UE 200, i.e., UE identifier 245, as well as the first quantity. Specifically, modulo computation module 246 may perform a modulo computation of "(UE identifier 245) mod (first quantity)" to find a remainder thereof. For example, if UE identifier 245 of UE 200 is a MSISDN, "5022409139", and the first quantity of the preamble signatures identified in block 310 is thirty (30), then UE 200 may perform the modulo computation "5022409139 mod 30", which results in a remainder of twenty-nine (29). Process 400 may proceed from block 450 to block 470.

At block 460, modulo computation module 246 of UE 200 may perform a modulo computation based on a unique identifier of UE 200, i.e., UE identifier 245, as well as the second quantity. Specifically, modulo computation module 246 may perform a modulo computation of "(UE identifier 245) mod (second quantity)" to find a remainder thereof. For example, if UE identifier 245 of UE 200 is a MSISDN, "5022409139", and the second quantity of the preamble signatures identified in block 310 is ten (10), then UE 200 may perform the modulo computation "5022409139 mod 10", which results in a remainder of nine (9). Process 400 may proceed from block 460 to block 480.

At block 470, UE 200 may designate one of group A preamble signatures 243 as a chosen preamble signature based on the remainder obtained by modulo computation module 246 in block 450. As described above, group A preamble signatures 243 are stored in preamble signature cache 242 and maintain a certain order or sequence. Therefore, UE 200 may pick a preamble signature in the sequence based on the remainder. For example, if group A preamble signatures 243 has 30 preamble signatures that are stored in a sequence, given that the remainder is 29, UE 200 will designate the $29^{th}$ preamble signature in the sequence as the chosen signature.

At block 480, UE 200 may designate one of group B preamble signatures 244 as a chosen preamble signature based on the remainder obtained by modulo computation module 246 in block 460. As described above, group B preamble signatures 244 are stored in preamble signature cache 242 and maintain a certain order or sequence. Therefore, UE 200 may pick a preamble signature in the sequence based on the remainder. For example, if group B preamble signatures 243 has 10 preamble signatures that are stored in a sequence, given that the remainder is 9, UE 200 will designate the $9^{th}$ preamble signature in the sequence as the chosen signature.

In the scenario where there are two mutually exclusive groups of preamble signatures reserved for CBRA, process 300 and process 333 may replace blocks 310, 320 and 330 with process 400 to designate the chosen preamble signature.

Conclusion

The ability for a UE to establish a successful communication link to a base station without having a preamble collision is crucial to the QoS and QoE of mobile communication. The techniques described in the present disclosure enable a UE to choose a preamble signature for RACH process according to a modulo computation that involves a unique identifier of the UE. The selection of the preamble signature is based on a remainder of the modulo computation. When all or most of the UEs served by a sector of the base station choose a preamble using the techniques described herein, the usage of the preamble signatures becomes more evenly distributed, and the chance of preamble collision is reduced. As a consequence, overall RRC success ratio for the UEs is enhanced, and the average setup time for placing a call is improved. The higher RRC success ratio and the shortened call setup time directly lead to an improved QoS and QoE of mobile communication service.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a user equipment (UE) of a mobile communication network, comprising:
    identifying a quantity of a plurality of preamble signatures reserved for contention-based random access (CBRA) to a base station of the mobile communication network, wherein the plurality of preamble signatures comprises a first group of preamble signatures and a second group of preamble signatures;
    performing a modulo computation based on a unique identifier of the UE and the quantity, wherein the modulo computation is performed based on determining of a message size margin, determining of a pathloss margin, or both;
    designating one of the plurality of preamble signatures as a chosen preamble signature based on a result of the modulo computation, wherein the designating comprises selecting the chosen preamble signature from the first group of the preamble signatures or the second group of the preamble signatures based on at least one of a size of data and a pathloss of an uplink;
    initiating a random access procedure using the chosen preamble signature to establish a communication link with the base station, wherein the communication link comprises the uplink via which the UE is to transmit the data to the base station;
    determining the message size margin is positive in response to a first sum being less than a message size threshold, the first sum being a sum of the size of the data, a size of a Medium Access Control (MAC) header and a size of MAC control elements; and
    determining the pathloss margin is positive in response to a second sum being less than a preamble power threshold, the second sum being a sum of the pathloss of the uplink, an initial transmit power of a preamble, a nominal power used for the uplink and a pathloss threshold offset.

2. The method of claim 1, wherein the unique identifier is a Mobile Station International Subscriber Directory Number (MSISDN) or an Integrated Circuit Card Identifier (ICCID).

3. The method of claim 1, wherein the identifying of the quantity comprises receiving a list of the plurality of preamble signatures that is broadcast by the base station.

4. The method of claim 1, wherein the modulo computation comprises dividing the unique identifier by the quantity to obtain a remainder, and wherein the result of the modulo computation comprises the remainder.

5. The method of claim 1, wherein:
the quantity is a sum of a first quantity and a second quantity, the first quantity being a quantity of the first group of preamble signatures, the second quantity being a quantity of the second group of preamble signatures, and
the modulo computation comprises dividing the unique identifier by the first quantity to obtain a remainder in response to determining the message size margin is positive or the pathloss margin is not positive,
the result of the modulo computation comprises the remainder, and
the designating of one of the preamble signatures as the chosen preamble signature comprises selecting the chosen preamble signature from the first group of the preamble signatures.

6. The method of claim 1, wherein:
the quantity is a sum of a first quantity and a second quantity, the first quantity being a quantity of the first group of preamble signatures, the second quantity being a quantity of the second group of preamble signatures, and
the modulo computation comprises dividing the unique identifier by the second quantity to obtain a remainder in response to determining the message size margin is not positive and the pathloss margin is positive,
the result of the modulo computation comprises the remainder, and
the designating of one of the preamble signatures as the chosen preamble signature comprises selecting the chosen preamble signature from the second group of the preamble signatures.

7. The method of claim 1, further comprising:
receiving a random access response from the base station in response to the initiating of the random access procedure;
transmitting a radio resource control (RRC) connection request to the base station in response to the receiving of the random access response; and
receiving a contention resolution from the base station for establishing the communication link in response to the transmitting of the RRC connection request.

8. The method of claim 1, wherein the random access procedure is a first random access procedure, the method further comprising:
determining that the communication link has failed to establish by the first random access procedure; and
initiating, in response to the determining that the communication link has failed to establish by the first random access procedure, a second random access procedure in a following random access slot using the chosen preamble signature to establish the communication link with the base station.

9. The method of claim 1, wherein the random access procedure is a first random access procedure, the method further comprising:
determining that the communication link has failed to establish by the first random access procedure; and
initiating, in response to the determining that the communication link has failed to establish by the first random access procedure, a second random access procedure using another preamble signature of the plurality of preamble signatures to establish the communication link with the base station.

10. The method of claim 1, wherein the mobile communication network employs a Long-Term Evolution (LTE) mobile communication standard.

11. One or more non-transitory computer-readable media storing computer-executable instructions which, when executed by one or more processors of a user equipment (UE) of a mobile communication network, direct the UE to:
identify a quantity associated with a plurality of preamble signatures reserved for contention-based random access (CBRA) to a base station of the mobile communication network, wherein the plurality of preamble signatures comprises a first group of preamble signatures and a second group of preamble signatures;
perform a modulo computation based on a unique identifier of the UE and the quantity, wherein the performing of the modulo computation is based on determining of a message size margin, determining of a pathloss margin, or both;
designate one of the plurality of preamble signatures as a chosen preamble signature based on a result of the modulo computation, wherein the designating comprises selecting the chosen preamble signature from the first group of the preamble signatures or the second group of the preamble signatures based on at least one of a size of data and a pathloss of an uplink;
initiate a random access procedure using the chosen preamble signature to establish a communication link with the base station, wherein the communication link comprises the uplink via which the UE is to transmit the data to the base station;
determine the message size margin is positive in response to a first sum being less than a message size threshold, the first sum being a sum of the size of the data, a size of a Medium Access Control (MAC) header and a size of MAC control elements; and
determine the pathloss margin is positive in response to a second sum being less than a preamble power threshold, the second sum being a sum of the pathloss of the uplink, an initial transmit power of a preamble, a nominal power used for the uplink and a pathloss threshold offset.

12. The one or more non-transitory computer-readable media of claim 11, wherein the unique identifier is a Mobile Station International Subscriber Directory Number (MSISDN) or an Integrated Circuit Card Identifier (ICCID).

13. The one or more non-transitory computer-readable media of claim 11, wherein the computer-executable instructions further direct the UE to:
receive a random access response from the base station in response to initiating the random access procedure;
transmit a radio resource control (RRC) connection request to the base station in response to receiving the random access response; and
receive a contention resolution from the base station for establishing the communication link in response to transmitting the RRC connection request.

14. A user equipment (UE) of a mobile communication network, comprising:
one or more processors;
a wireless transceiver;
memory having instructions stored therein, wherein the instructions, when executed by the one or more processors, cause the one or more processors to:
identify a quantity associated with a plurality of preamble signatures reserved for contention-based random access (CBRA) to a base station of the mobile communication network, wherein the plurality of preamble signatures comprises a first group of preamble signatures and a second group of preamble signatures;
perform a modulo computation based on a unique identifier of the UE and the quantity, wherein the performing of the modulo computation is based on determining of a message size margin, determining of a pathloss margin, or both;
designate one of the plurality of preamble signatures as a chosen preamble signature based on a result of the modulo computation, wherein the designating comprises selecting the chosen preamble signature from the first group of the preamble signatures or the second group of the preamble signatures based on at least one of a size of data and a pathloss of an uplink;
initiate a random access procedure via the wireless transceiver using the chosen preamble signature to establish a communication link with the base station, wherein the communication link comprises the uplink via which the UE is to transmit the data to the base station;
determine the message size margin is positive in response to a first sum being less than a message size threshold, the first sum being a sum of the size of the data, a size of a Medium Access Control (MAC) header and a size of MAC control elements; and
determine the pathloss margin is positive in response to a second sum being less than a preamble power threshold, the second sum being a sum of the pathloss of the uplink, an initial transmit power of a preamble, a nominal power used for the uplink and a pathloss threshold offset.

15. The UE of claim 14, wherein the unique identifier is a Mobile Station International Subscriber Directory Number (MSISDN) or an Integrated Circuit Card Identifier (ICCID).

16. The UE of claim 14, wherein the instructions further cause the one or more processors to:
receive, via the wireless transceiver, a random access response from the base station in response to initiating the random access procedure;
transmit, via the wireless transceiver, a radio resource control (RRC) connection request to the base station in response to receiving the random access response; and
receive, via the wireless transceiver, a contention resolution from the base station for establishing the communication link in response to transmitting the RRC connection request.

17. The UE of claim 14, wherein the identifying of the quantity comprises receiving a list of the plurality of preamble signatures that is broadcast by the base station.

18. The UE of claim 14, wherein the mobile communication network employs a Long-Term Evolution (LTE) mobile communication standard.

19. The UE of claim 14, wherein the modulo computation comprises dividing the unique identifier by the quantity to obtain a remainder, and wherein the result of the modulo computation comprises the remainder.

20. The UE of claim 14, wherein:
the quantity is a sum of a first quantity and a second quantity, the first quantity being a quantity of the first group of preamble signatures, the second quantity being a quantity of the second group of preamble signatures, and
the modulo computation comprises dividing the unique identifier by the first quantity to obtain a remainder in response to determining the message size margin is positive or the pathloss margin is not positive,
the result of the modulo computation comprises the remainder, and
the designating of one of the preamble signatures as the chosen preamble signature comprises selecting the chosen preamble signature from the first group of the preamble signatures.

* * * * *